United States Patent

Cochran et al.

[15] 3,687,543
[45] Aug. 29, 1972

[54] OPTICAL DATA PROCESSOR

[72] Inventors: Gary D. Cochran; Louis J. Cutrona; Arthur L. Ingalls, all of Ann Arbor, Mich.

[73] Assignee: Conductron Corporation, Ann Arbor, Mich.

[22] Filed: April 26, 1963

[21] Appl. No.: 276,698

[52] U.S. Cl. .................................................355/52
[51] Int. Cl. ............................................G03b 27/32
[58] Field of Search .......346/107; 95/4.5, 13, 14, 75; 88/16.8, 22–24, 24 H–R, 57; 340/172.5; 35/2; 343/5 R

[56] References Cited

UNITED STATES PATENTS 2,746,833  5/1956  Jackson.....................346/107
2,890,622  6/1959  Wallin............................88/57
2,975,670  3/1961  Hemstreet.....................88/24

Primary Examiner—Verlin R. Pendegrass
Attorney—Barnes, Kisselle, Raisch & Choate

[57] ABSTRACT

An improvement in an optical data processor for processing periodic data presented in an aperture of an optical system for the purpose of viewing or recording processed data which comprises:
a. means for partial control of an image line of recorded data to correct tilt in said line,
b. means in optical alignment with said first means for bringing said image line into final upright position relative to an optical axis, and
c. means for optically combining said image line with another image line, one focused in azimuth and the other in a range direction into a single line to eliminate astigmatism between the two.

17 Claims, 3 Drawing Figures

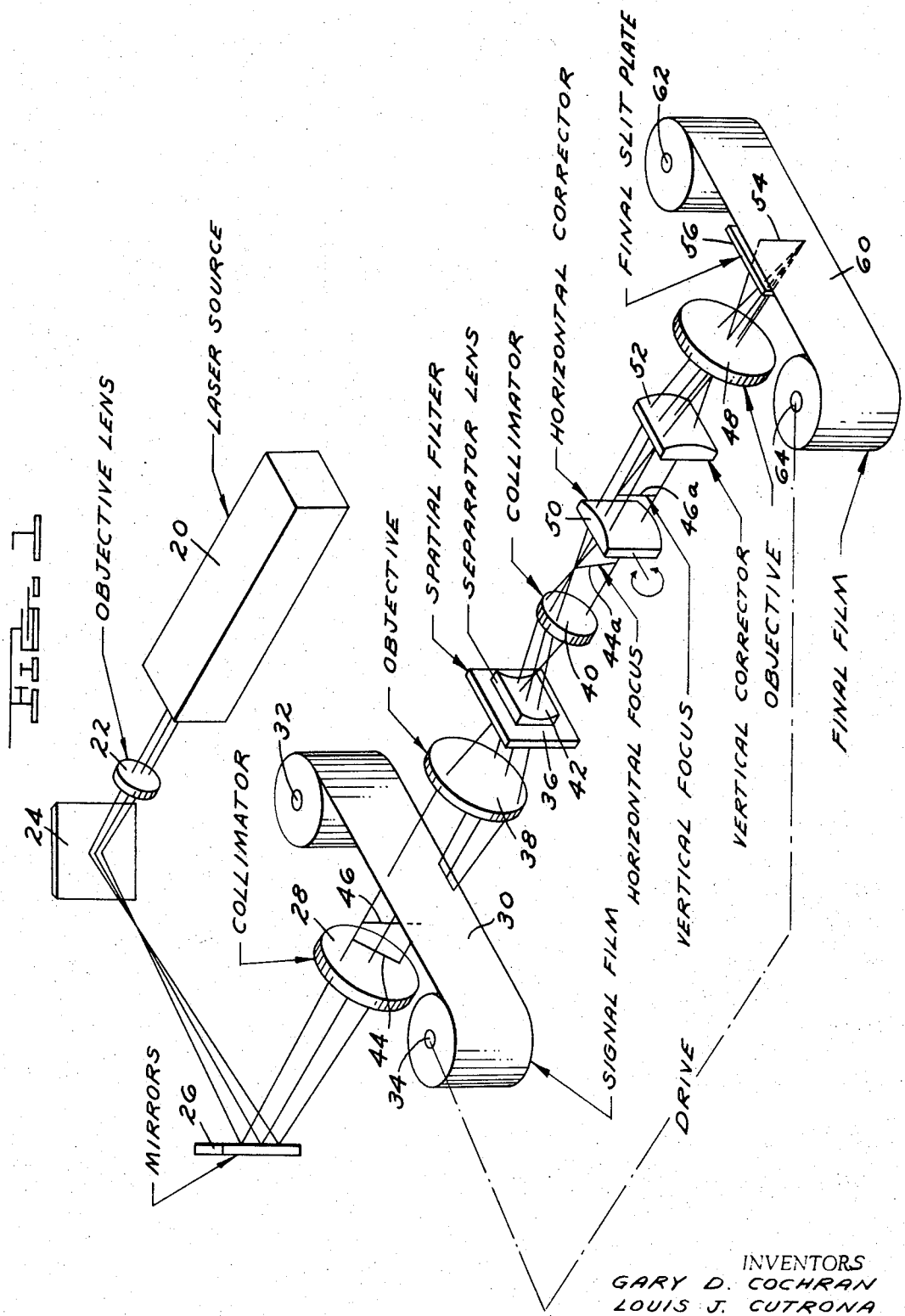

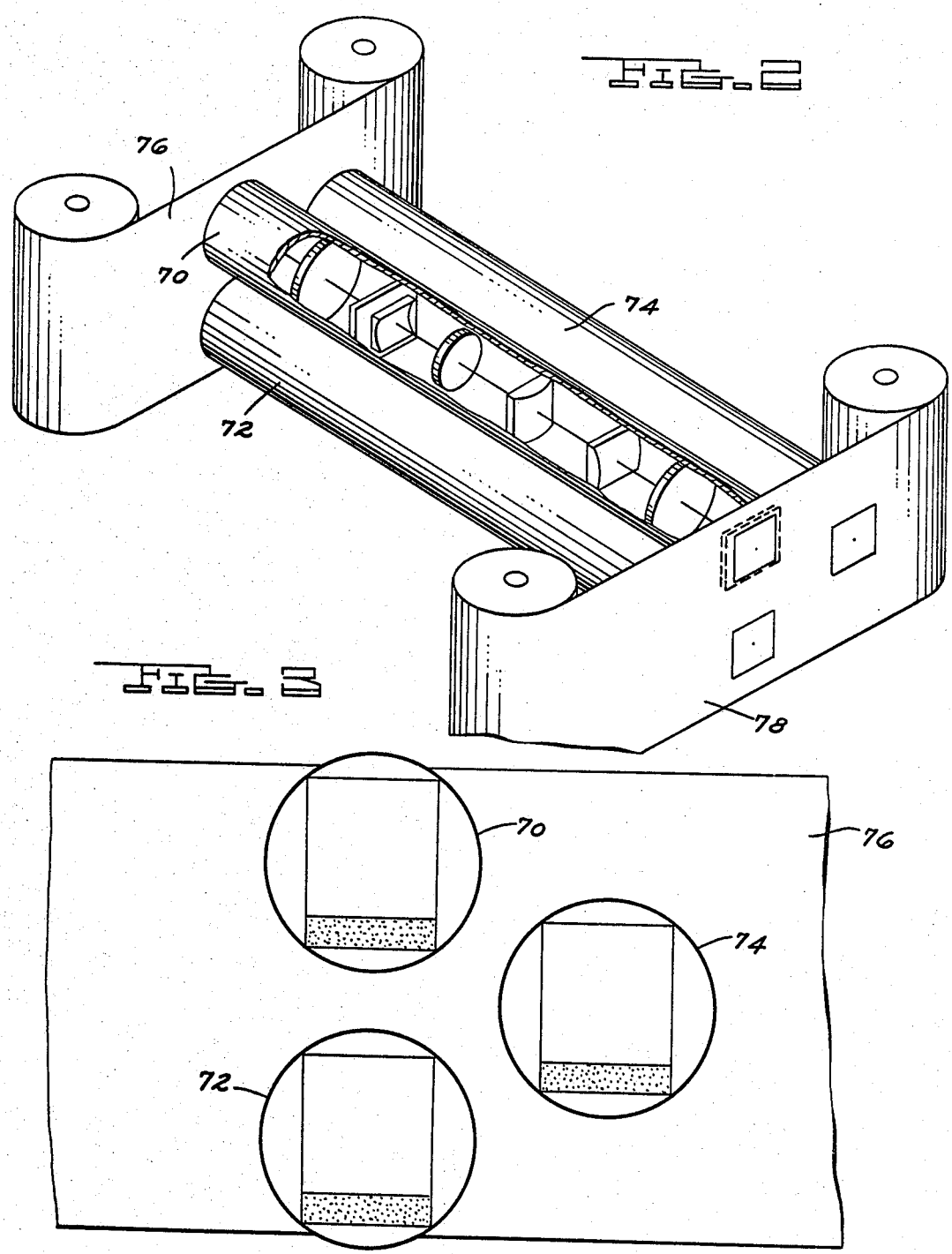

OPTICAL DATA PROCESSOR

This invention relates to a method and apparatus for processing radar data and to an optical system for processing fine resolution radar signals on a film into a high resolution radar strip map. The method and apparatus have other uses wherever data of a periodic nature needs to be processed.

With the introduction of two-dimensional processing based on simultaneous processing of Doppler azimuth data and optical pulse compression of long linearly frequency-modulated pulses, it became necessary to use coherent light in two dimensions. This has been generated by focusing a very bright source on a pin hole and collimating the light passing through on the opposite side.

The amount of light obtained is orders of magnitude less than would be available for one-dimensional processing with the use of a slit. Since previously designed optical processors were unable to image the zone plate focal points in such a manner that they track the final film, the final image was sampled with a narrow slit. This reduced considerably the amount of energy available for exposing the final film. The processing rate was therefore limited by the sensitivity and speed of the final film.

The present invention is directed to a new optical system which is designed to process one or two-dimensional data, allowing the image to track the final film and thus, with a limited amount of light, prolong the exposure on the final film and produce a far superior final strip map.

Another advantage of tracking is that non-coherent integration capability is added to the coherent integration capability of the data processor which tends to suppress optical noise in the form of diffraction patterns, thus eliminating an unwanted feature inherent in highly coherent illumination such as the Laser.

Two of the problems in connection with optical processing have been the size and weight of the apparatus required. Reduction in size and weight, according to normal methods, would require an increase of the density of data on film so that smaller aperture optical systems could be used. This would require higher resolution recording media and new recording techniques.

The object of the present invention is to produce a smaller and more compact processing device by the use of an apparatus which will split the field of view into two or more sections so that smaller aperture processors can be used on the same film, thus eliminating many optical aberrations that occur in a large field and producing a superior quality image.

This system lends itself to the use of multi-barrel signal processor devices. A "barrel" refers to a processing unit consisting of a number of lenses on an optical axis. The barrels are so arranged as to accept light from sections of the signal film, process data from the signal film and record it in proper position on a final film.

A further object of the invention is the use of an afocal system of lenses to obtain a correction of what is called the locus of azimuth focus with respect to range. In more general terms, the focus is sometimes a straight tilted line with respect to the optical axis due to the peculiar recording on the film being viewed.

It is an object of the apparatus and the system herein to be described to correct this angle of tilt with respect to the optical axis so that it is resolved for proper focus on a signal image plane.

It is another object of the invention to cause proper tracking between the final image and the final film, that is, to correct the azimuth magnification so that it is constant with range. "Tracking" is the unity of motion occuring between final image and final film.

It is a further object to image a focal line in the range direction created by the signal film into a line of good focus in the final image plane. The device is intended for either one-dimensional or two-dimensional processing in that the range line created by the signal film may be in the plane of the signal plane for one-dimensional processing or somewhat removed from the signal film in the case of two-dimensional processing. By "azimuth" is meant the direction of the high resolution radar parallel to the line of the moving recording system; and by "range" is meant the distance of scanning perpendicular to the azimuth direction.

Other objects and features of the invention will be apparent in the following detailed description of the method and apparatus.

Drawings accompany the disclosure and the various views thereof may be briefly described as:

FIG. 1, a diagrammatic perspective view of the focal system used as a data processor.

FIG. 2, a perspective view of a multi-barrel signal processor arrangement.

FIG. 3, a diagrammatic sectional view of an overlap of the viewing areas.

A fine resolution radar signal film consists of signal returns derived from targets which have passed through the moving side-looking radar beam. Resolution in the azimuth direction is obtained by coherent processing of the accumulated data in a channel generated by the passage of a target through the beam. The data processor uses the fact that the recorded azimuth Doppler return from any one target has focusing properties similar to a lens.

In the recording in the range direction, large separation or resolution is obtained either by the use of a short radar pulse which automatically gives separation in the plane of the signal film or by a long coded pulse such as a frequency modulated pulse which produces a focus somewhat out of the signal film plane. In either case, a locus arranged focus is a straight line perpendicular to the optical axis.

The problem is to focus both the azimuth direction and the range direction properties of a signal into a single point on the final film plane. The major difficulty in performing this task is to correct the range dependent focal lengths of the azimuth data in such a way as to agree in focus and magnification with the range direction.

Since range and azimuth focusing need to be handled separately in order to affect the desired final focus, certain cases can be encountered in the design of the system such that the range line and the azimuth line may be co-incidental at one point. In this case, individual corrective lenses need to be used in both the range and azimuth directions which lenses would need to occupy the same physical space and would therefore mechanically interfere. By making use of a separator lens within the afocal system, a shift can be effected in either the azimuth focus or the range focus, thereby allowing physical separation of the two corrective lenses involved.

In FIG. 1 the complete system is shown wherein a light source 20 is directed toward an objective lens 22 and reflected from angled mirrors 24 and 26 to a collimator lens 28. While a number of different light sources might be used, the element 20 shown diagrammatically can be a Laser which is a light source now available having a high intrinsic brilliance. The helium-neon gas Laser can be made to emit light at a wave length of 6,328 Angstroms which lies in the red part of the light spectrum.

Due to the fact that a Laser emits a small cross-section of parallel light, an optical system is necessary to expand the cross-section to a size insuring adequate area illumination at the signal film. It is also convenient and necessary in this system that the light illuminating the signal film also be collimated or parallel light. To effect this, the two lenses 22 and 28 are used which form an afocal system which will increase the beam cross-section if the focal length of lens 28 is greater than that of lens 22. As a matter of fact, the magnification of the afocal system being the ratio of the focal lengths of lens 28 to lens 22 increases the cross-section proportionately. The purpose of the mirrors 24 and 26 is simply to fold the optical system and thereby make the equipment shorter.

It will be understood that the various portions of the optical system shown in FIG. 1 are suitably mounted in a customary way within a longitudinal chamber, sometimes referred to as a barrel. Any conventional means of mounting is acceptable. In an optical data processor, such as this, a signal film transparency is used as the input data. The transparency on the film can be written in many ways. However, in the case of high resolution radar, the data is recorded in such a way that specific forms of data occur. These data in general consist of a summation of overlapping two-dimensional forms similar to a general configuration of zone plates which, under analysis, using light tend to exhibit focal points of light. To the naked eye, this recorded data would appear to be points or lines of density or transmission having structure in both azimuth and range directions. A recording for only one point target in the radar field would look like a zone plate of either elliptical or hyperbolic shape in which a special case could be a circular zone plate similar to those described in books on physical optics. This would be called a two-dimensional recording. Signal film having one-dimensional recording would exhibit a structure similar to a section of a zone plate extending in the azimuth direction while having only a thin width corresponding to a resolution element in the range direction.

The signal film 30 in FIG. 1 is suitably mounted on spaced axes 32 and 34 for transverse motion across the optical axis at a predetermined rate of speed. This mounting again is a conventional mounting.

The result of illuminating a radar signal film of the type described is the formation of image points connected with the zone plate elements in the signal film. This is an inherent property of such zone plates. Since the properties of the zone plates change with range, the locus of such inherent focal points describe straight lines with respect to the signal film. In general, only two of these lines are useful so that additional light giving rise to other images is excluded by the spatial filter element 36. This spatial filter is made to exclude either the positive or negative focus of the signal recordings as desired as well as higher diffracted orders and the direct illumination or infinite focus lines undeviated by the signal film, thus passing only the desired focal lines. In the example shown, the filter is intended to remove all but the negative focus lines.

In the next stage along the optical axis beyond the film 30 is an objective lens 38 and a collimator lens 40 on either side of a separator lens 42, the separator lens being positioned directly adjacent the previously described spatial filter 36, both of which are essentially at the principal focus of objective lens 38. Lenses 38 and 40 used without the separator lens 42 are separated by the sum of their focal lengths and form an afocal optical system which images both the slanted azimuth line 44 and the perpendicular range line 46, these lines optically being virtual, to new positions in space. In FIG. 1, these lines lie in the space preceding the signal film 30.

The objective lens 38 is considered to be a positive lens while collimator lens 40 may theoretically be either positive or negative as long as the two lenses are separated by the sum of their focal lengths to form an afocal system. However, if the collimator lens 40 is negative, the spatial filter and separator lenses must be placed in another location such as before a final objective lens 48. In the afocal system of lenses 38 and 40, if the second spherical lens has a shorter focal length than the first, a demagnification will result in which the slope of the tilted line 44 and the vertical height of both lines 44 and 46 will be reduced as shown in lines 44a and 46a. Having progressed this far in the system, it is essential to bring the two lines 44a and 46a into optical co-incidence. This is accomplished by the use of cylindrical lens 50 with respect to line 44a and cylindrical lens 52 with respect to line 46a, these cylindrical lenses being spaced along the optical axis of the system. Cylindrical lens 50 is mounted on a rotational axis perpendicular to the cylindrical axis and also perpendicular to the optical axis so that it can be tilted to a plane parallel to line 44a, its power being effective in the azimuth direction. The effect of these two cylindrical lenses 50 and 52 is to produce parallel light in both the range and azimuth directions from each and all points on lines 44a and 46a and to maintain proper magnification when used with the rest of the system. The lens 52 is a cylindrical lens whose cylindrical axis is perpendicular to the optical axis and parallel to the azimuth direction so that its power is effective in the range direction.

The function of the separator lens 42 is to optically separate the range line 46a from the tilted azimuth line 44a. The separator lens 42 is a cylindrical lens which may be either positive or negative and may be oriented in either the range or azimuth direction depending upon whether it is more desirable to shift line 44a or 46a with respect to position and direction. In the example shown in FIG. 1, the separator lens is inserted with its cylindrical axis in the azimuth direction so that its power appears in the range direction. This has the effect of moving line 46a in a direction toward the final film.

The function of objective lens 48 is to receive the collimated or parallel light from lenses 50 and 52 and convert this light into an image on the final film as represented by line 54. This completes the integration of lines 44a and 46a into a single well-focused line. A final slit plate 56 contains a slit aperture which limits the distance through which line 54 may travel and expose the final film 60. A reasonable slit width for the final slit is of the order of one millimeter. This travel is inherent in the operation of a traveling signal film having recorded on it lens-like elements. The final film 60 is also mounted for motion on the spaced axes 62 and 64 for an interlocked movement with the film 30. Thus, with the optical system described used with the coherent light source in connection with the signal film and the final film, a superior exposure is obtained on the final film. This occurs because of the correct magnification of both the azimuth line and the range line and the co-incidential location thereof at the final exposure slit. It also occurs because of the tracking effect of the signal which is moving with the final film and thus can prolong the exposure and accordingly improve it.

Due to the critical maintenance of proper magnification and of the same magnification at all ranges, the image movement across the final slit is the same at all ranges throughout the length of the slit and thus the tracking occurs throughout the entire length of the slit.

Between the signal film and the final film, there are optically two afocal systems, the first of which, composed of lenses 38 and 40, effectively reduces the sizes of the focal lines, and the second of which, composed of lenses 50–52 and 48, magnify the lines again. In the second afocal system, lenses 50 and 52 in this instance are the equivalent of a spherical lens, and, working at right angles to each other, i.e. positioned orthogonally, perform the function of combining lines 44a and 46a into a single line 54. The primary function of the separator lens 42 is to further separate lines 44a and 46a so that lenses 50 and 52 do not physically or mechanically interfere.

Magnification is maintained by the correct choice of focal lengths. If unity magnification is to be retained from signal film to final film, it is done by making the demagnification of the first afocal system and the magnification of the second afocal system equal. The separator lens 42 does not enter into the magnification problem. If a different magnification is desired, the focal length of objective lens 48 may be changed. In this case, it is necessary to change the width of the final film and its speed correspondingly.

In FIG. 2, a multi-barrel system is shown, each barrel 70, 72, 74 containing an optical system of the type illustrated in FIG. 1. A single film strip at each end of the barrels can be used as the signal film 76 and the final film 78, there being a slight overlap of area as shown in FIG. 3. With this type of system, a single light source can be used for all three barrels. In this multi-barrel system, it is necessary to maintain critical alignment between the three barrels in order to have range continuity in the output field. An overall reduction of weight and volume of a multi-barrel processor as compared to a single barrel operating over the same field is of order $1/n^2$ where $n$ is the number of barrels used.

The advantage of a multi-barrel system over a single-barrel system is two-fold: one, the weight, size and volume of the total equipment is reduced, and, secondly, each optical system occurs over a smaller field so that either a further reduction in size is possible or a field with less optical aberrations is obtained.

There is an optimum relationship between lens 42, line 46a, and lens 50 obtainable when lens 42 is of a predetermined power. This power is selected so that line 46a will on the average lie in the plane of lens 50,— that is, as nearly co-planar as possible with lens 50. As previously described lens 50 has a tilt adjustment and this may require slight variations from the optimum condition.

What we claim is:

1. An improvement in an optical data processor for processing periodic data presented in an aperture of an optical system for the purpose of viewing or recording processed data which comprises:
   a. means for partial control of an image line of recorded data to correct tilt in said line,
   b. means in optical alignment with said first means for bringing said image line into final upright position relative to an optical axis, and
   c. means for optically combining said image line with another image line, one focused in azimuth and the other in a range direction into a single line to eliminate astigmatism between the two.

2. An improvement in an optical data processor processing periodic data presented in an aperture of an optical system and viewing or recording processed data which comprises:
   a. means for partial control of a line resulting from inherent focal points of a signal input,
   b. means in optical alignment with said first means for bringing said line into final upright position, and
   c. means for optically separating said line from a second focal line, one in azimuth and one in range direction, so that said separated lines may be acted upon independently by a lens control system.

3. An improvement in an optical data processor for processing periodic data presented in an optical aperture of a system and viewing or recording said data which comprises:
   a. means for partial control of a line resulting from inherent focal points of a signal input,
   b. means in optical alignment with said first means for bringing said line into final upright position,
   c. means for optically separating said line from a second focal line, one in azimuth and one in range direction, so that said separated lines may be acted upon independently by a lens control system, and
   d. means for combining said two lines into a single line at the output of a system to eliminate astigmatism.

4. An improvement in an optical data processor for processing periodic two-dimensional data including data in an azimuth direction and data in a range direction presented in an optical aperture of a system for the purpose of viewing or recording said data which comprises:
   a. means for creating two separate image lines, one for the azimuth direction and one for the range direction, one of said lines being atilt by reason of the optics of the signal data recording, b. means for partial control of the tilt of said one line,
c. means for bringing said one line into final upright position,
d. means for separating said two image lines so that they may be acted upon independently by lenses, and
e. means for combining said two lines, one focused in the azimuth direction and the other in the range direction into a single line to eliminate astigmatism between the two.

5. An optical data processor for processing two-dimensional periodic data including data in an azimuth direction and data in a range direction presented in an optical aperture of a system which comprises:
   a. means for creating separate optical lines for the azimuth direction and the range direction of the data, said azimuth line being atilt by reason of the optical characteristics of the periodic data,
   b. means for controlling the tilt of said azimuth line to bring it into final upright position, and
   c. means for combining said azimuth line and said range line into a single real line to eliminate astigmatism between the two.

6. An improvement in an optical data processor for processing periodic data from a moving input film strip and recording it in an output plane of a final film strip which comprises:
   a. optical means for creating two image lines, one focused in the azimuth direction and the other focused in the range direction, said azimuth line being atilt by reason of the optical characteristics of said input film,
   b. means for controlling the tilt of said line to bring it into a final erect position,
   c. means for separating said two lines so that they may be acted upon independently by a suitable lens system,
   d. a lens system for combining said two lines into a single line to eliminate astigmatism between the two, and
   e. means for preserving constant magnification of said lines.

7. A device as defined in claim 6 in which the means for separating the two focal lines comprises:
   a. a separator lens, and
   b. said means for preserving constant magnification includes a double afocal system, one of which demagnifies the focal lines and the second of which magnifies the focal lines, said second system comprising a pair of cylindrical lenses disposed orthogonally.

8. An optical data processor for processing periodic data which comprises:
   a. a light source,
   b. a film having azimuth and range data of a periodic nature adapted to be moved past said light source wherein are formed azimuth and range lines,
   c. a first afocal system to demagnify said lines and change tilt of one of said lines,
   d. a second afocal system to magnify said lines and further correct tilt of one of said lines and to bring said lines into coincidence, and
   e. a final recording film movable in ratio to said first film to receive said lines through a slit aperture wherein a tracking of said lines on said film occurs during exposure of said final film to said lines.

9. An optical data processor for processing periodic data as defined in claim 8 in which the afocal system to magnify said lines and further correct tilt of one of said lines comprises a pair of spaced cylindrical lenses, at least one of which is movable about an axis orthogonally related to the axis of the cylinder and the axis of the optical system, and further includes an objective lens.

10. An optical data processor for processing periodic data as defined in claim 8 in which a separator lens is inserted in one of said afocal systems to increase separation of the range line and azimuth line to permit independent correction of said lines.

11. An optical data processor for processing periodic data as defined in claim 8 and in which a spatial filter and a separator lens are inserted in one of said first afocal systems at or near the principal focus point of both lenses thereof, to respectively select the desired focus lines of said light and to increase separation of the range line and azimuth line to permit independent correction of said lines.

12. An optical data processor for processing periodic data which comprises:
   a. a light source,
   b. an afocal system to expand and collimate light from said light source,
   c. a film having azimuth and range data of a periodic nature adapted to be moved past said light source wherein are formed azimuth and range focal lines,
   d. a first afocal system to demagnify and correct tilt of said lines,
   e. a separator lens to increase separation of the range line and the azimuth line,
   f. a second afocal system to magnify and further correct tilt of said lines and to bring said lines into coincidence, and
   g. a final recording film movable in ratio to said first film to receive said lines through a slit aperture wherein a tracking of said lines on said film occurs during exposure of said final film to said lines.

13. An optical data processor for processing a continuous record of periodic data and recording a correlated variation thereof on a continuous record, which comprises:
   a. a laser light source emitting parallel light in small cross-section,
   b. an afocal system to expand and collimate light from said laser light source,
   c. a strip of recorded periodic data mounted for movement past said light source carrying data serving as a zone plate to create spatial images in an optical system,
   d. an afocal system to transfer said images to new positions in space along the axis of an optical system,
   e. a separator lens to effect separation of said spatial images along the axis of said optical system,
   f. a second afocal system to manipulate said images relative to each other to a desired relative position,
   g. means optically to merge said images in said optical system,
   h. means forming a slit aperture in direct line with a transverse path of said merged images resulting from motion of said strip of recorded data, and i. a final, light-sensitive recording strip movable past said slit in ratio to said first strip to receive exposure during the transverse movement of said merged images past said slit.

14. An optical data processor for processing a continuous record of periodic data and recording a correlated variation thereof on a continuous record, which comprises:
   a. a laser light source emitting parallel light in small cross-section,
   b. an afocal system to expand and collimate light from said laser light source,
   c. a strip of recorded periodic data mounted for movement past said light source carrying data serving as a zone plate to create a spatial image in an optical system,
   d. an afocal system to transfer said image to a new position in space along the axis of an optical system,
   e. a second afocal system to manipulate said image to a desired corrected position in said optical system,
   f. means forming a slit aperture in direct line with a transverse path of said corrected image resulting from motion of said strip of recorded data, and
   g. a final, light-sensitive recording strip movable past said slit in ratio to said first strip to receive exposure during the transverse movement of said corrected image past said slit.

15. An optical data processor for processing a continuous record of periodic data and recording a processed variation thereof on a continuous record as defined in claim 12 in which a plurality of parallel optical systems are fixed between said data film and said recording film each spaced transversely relative to each other and said film to read, and record on, only a portion of said films to facilitate processing of relatively wide film to minimize lens aberration.

16. An optical data processor for processing a continuous record of periodic data and recording a variation thereof in a continuous record as defined in claim 14 in which a plurality of parallel optical systems are fixed between the moving strip of recorded data and the moving recording strip each spaced transversely relative to each other and said strips to read, and record on, only a portion of said strip to facilitate processing of relatively wide strip to minimize lens aberration.

17. An optical data processor for processing a continuous record of periodic data and recording a processed variation thereof on a continuous record, which comprises:
   a. a light source,
   b. a film having azimuth and range data of a periodic nature adapted to be moved past said light source and serving as a zone plate to create spatial images in the form of azimuth and range lines in an optical system,
   c. a first afocal lens system in said optical system to demagnify said lines and change the tilt of said azimuth image line and recreate the images in a second position along the optical axis of said system,
   d. a second afocal lens system in said optical system to bring said azimuth and range lines into coincidence and to further correct the tilt of said azimuth image line, said second afocal lens system comprising a pair of spaced cylindrical lenses, one of which is positioned generally at the second position of the azimuth image line in said optical system and which is movable about an axis orthogonally related to the axis of the cylinder and the axis of the optical system,
   e. an objective lens to co-operate with said cylindrical lenses to remagnify said image lines, and
   f. a final recording film movable in ratio to said first film to receive said coincidence image line through a slit aperture wherein a tracking of said lines on said recording film occurs during exposure of said final film through said slit aperture.

* * * * *